United States Patent
Yamamoto et al.

[11] 3,723,464
[45] Mar. 27, 1973

[54] PROCESS FOR MANUFACTURING NITROBENZODIAZEPINE DERIVATIVES

[75] Inventors: Hisao Yamamoto, Nishinomiya; Shigeho Inaba, Takarazuka; Tadashi Okamoto, Ashiya; Toshiyuki Hirohashi, Kobe; Kikuo Ishizumi, Minoo; Michihiro Yamamoto, Takarazuka; Isamu Maruyama, Minoo; Kazuo Mori, Kobe; Tsuyoshi Kobayashi, Minoo, all of Japan

[73] Assignee: Sumitomo Chemical Company, Ltd., Osaka, Japan

[22] Filed: Apr. 6, 1971

[21] Appl. No.: 131,767

Related U.S. Application Data

[62] Division of Ser. No. 770,815, Oct. 25, 1968, Pat. No. 3,658,809.

[52] U.S. Cl. .................................................260/326.15
[51] Int. Cl. ...................................................C07d 27/56
[58] Field of Search..................................260/326.15

[56] References Cited

UNITED STATES PATENTS 3,466,287  9/1969  Archer................................260/268

Primary Examiner—Alex Mazel
Assistant Examiner—Joseph A. Narcavage
Attorney—Stevens, Davis, Miller & Mosher

[57] ABSTRACT

Benzodiazepine derivatives, which have been well known as excellent tranquillizers and which have the formula,

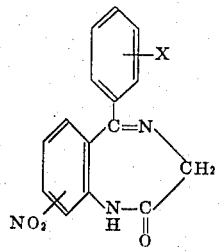

wherein X signifies a hydrogen or halogen atom, are obtained by reacting with an oxidizing agent, such as chromic acid or the like, a novel 2-aminomethylindole derivative of the formula,

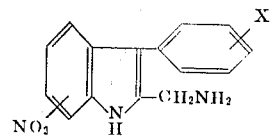

wherein X has the same significance as mentioned above.

The starting 2-aminomethylindole derivatives are prepared by reacting a nitrophenylhydrazine of the formula,

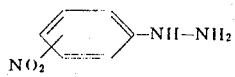

with a phenylpyruvic acid derivative of the formula,

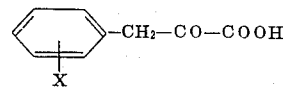

wherein X has the same significance as mentioned above, to give an indole 2-carboxylic acid derivative of the formula,

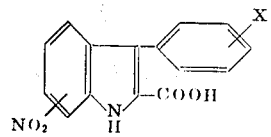

wherein X has the same significance as mentioned above, converting the indole-2-carboxylic acid derivative to a corresponding amide derivative, dehydrating the amide to a corresponding nitrile derivative, and then reducing the formed nitrile derivatives.

1 Claim, No Drawings

PROCESS FOR MANUFACTURING NITROBENZODIAZEPINE DERIVATIVES

This application is a division of my co-pending application, Ser. No. 770,815, filed Oct. 25, 1968, now U.S. Pat. No. 3,658,809.

BACKGROUND OF THE INVENTION

1. Field of the Invention

This invention relates to a process for producing benzodiazepine derivatives. More particularly, the invention pertains to a process for preparing benzodiazepine derivatives having prominent effects as tranquillizers, muscle-relaxants, spasmolytics, and hypnotics which are represented by the formula,

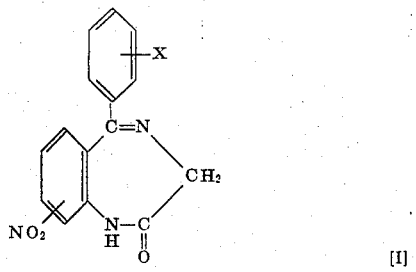

wherein X signifies a hydrogen or halogen atom.

2. Prior Arts

The benzodiazepine derivatives represented by the formula [I] are compounds well known as prominent tranquilizers, muscle-relaxants, dispasmolytics and hypnotics (cf. L. H. Sternbach et al.: J. Med. Chem., 6 261). As methods for producing the benzodiazepine derivatives, several processes have been known. For example, a benzodiazepine derivative is obtained in a poor yield by reacting a 2-aminobenzophenone derivative with glycine hydrochloride or glycine ethyl ester (German Pat. No. 1,145,626).

A benzodiazepine derivative is also prepared by treating the bromoacetamide derivatives of aminonitrobenzophenone with ammonia and cyclizing the resulting aminoacetamide derivatives. (cf. L. H. Sternbach et al.: J. Med. Chem., 6 261; German Pat. No. 1,136,709)

A 7-nitro-benzodiazepine derivative is also prepared by direct nitration of benzodiazepine derivative with a mixture of concentrated sulfuric acid and potassium nitrate. (cf. L. H. Sternbach et al.: ibid; German Pat. No. 1,136,709)

DISCLOSURE OF THE INVENTION

The inventors have found that the benzodiazepine derivatives of the formula [I] can be obtained in high yields by reacting with an oxidizing agent, a 2-aminomethylindole derivative, or its salt, represented by the formula, wherein X has the same significance as mentioned before.

Such surprising process from a 5-membered ring compound to a 7-membered ring compound due to ring expansion reaction has not heretofore been described in any literature. Therefore, the novel process of the present invention is unobvious from the known method of the similar processes, and moreover very much useful and unexpected procedure.

The 2-aminomethylindole derivatives employed as starting materials in the above reaction are novel compounds, and are easily prepared, for example, by hydrogenating corresponding indole-2-carbonitrile derivatives. Further, the above-mentioned indole-2-carbonitrile derivatives also are novel compounds, and are obtained, for example, by the amidation of free indole-2-carboxylic acid derivatives followed by dehydration of the resultant amide derivative. Still further, the said indole-2-carboxylic acid derivatives also are novel compounds, and are obtained from, for example, nitrophenylhydrazine and phenylpyruvic acid derivatives.

The all of the above-mentioned compounds can be prepared smoothly and in high yields. Accordingly, the present process is markedly useful as a practical process for the production of the aforesaid benzodiazepine derivatives represented by the formula [I].

A primary object of the present invention is to provide a process for the advantageous production of the benzodiazepine derivatives represented by the formula [I].

Another object is to provide novel indole derivatives and processes for the preparation thereof.

Other objects will be apparent from the following description.

In order to accomplish the above objects, the present invention provides a process for producing the benzodiazepine derivatives of the formula [I], characterized in that the 2-aminomethylindole derivative represented by the formula [II], or salt thereof, is allowed to react with an oxidizing agent.

The 2-aminomethylindole derivatives of the formula [II], which are used in the present invention, are novel compounds and are synthesized from known compounds through several processes.

The reactions may be summarized in the following schema, but the present invention is not limited only to the said process.

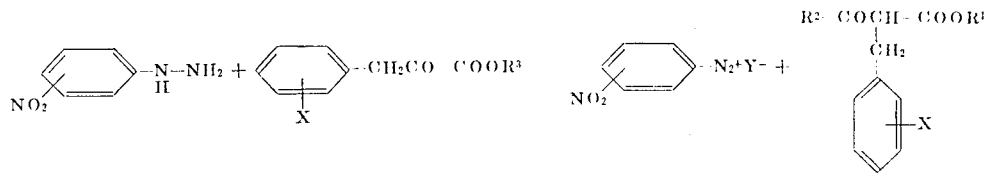
| Nitrophenyl-hydrazine | Phenylpyruvic acid derivative | Nitrobenzene diazonium compound | α-Benzyl-β-keto-acid ester |
|---|---|---|---|
| [III] | [IV] | [V] | [VI] |
Phenylhydrazone derivative
[VII]
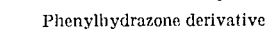
Indole-2-carboxylic acid derivative
[VIII]
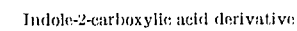
Indole-2-carboxylic halide derivative
[IX]
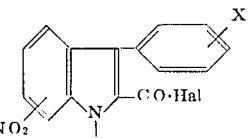
Indole-2-carboxamide derivative
[X]
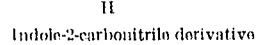
Indole-2-carbonitrile derivative
[XI]

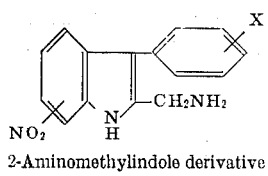

2-Aminomethylindole derivative

[II]

↓

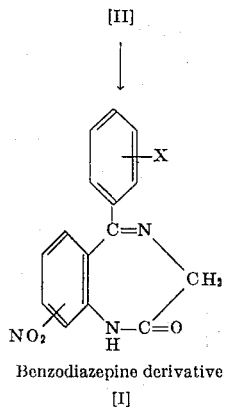

Benzodiazepine derivative

[I]

In the above equations, $R^1$ is an alkyl group having 1–4 carbon atoms, e.g., a methyl, ethyl, isopropyl or tertiary butyl group; $R^2$ is an alkyl group having 1–4 carbon atoms, e.g., a methyl or ethyl group; $R^3$ is $R^1$ or a hydrogen atom; X is a hydrogen or halogen atom, e.g. a chlorine, bromine or fluorine atom; and Y is a halogen atom, e.g. a chlorine or bromine atom.

The present process will be illustrated in detail as follows.

[A] Preparation of Phenylhydrazone derivative [VII]

The phenylhydrazone derivative [VII] employed in the present process is a novel compound, and is prepared either by reacting a corresponding nitrophenylhydrazine derivative [III], or an acid salt thereof, with the phenylpyruvic acid derivative [IV], or by reacting the nitrobenzenediazonium compound [V] with the ester of α-benzyl-β-keto-acid derivative [VI]. In the case of the latter reaction, the resulting phenylhydrazone derivatives are only those of the formula [VII] in which $R^3$ is identical with $R^1$, and contain no hydrogen. That is, there are obtained phenylhydrazone derivatives represented by the formula,

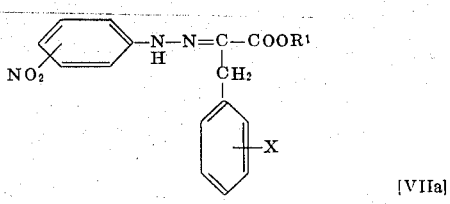

[VIIa]

The reaction of nitrophenylhydrazine [III] with phenylpyruvic acid derivative [IV] is explained below.

The phenylhydrazone derivative [VII] is obtained by reacting the nitrophenylhydrazine [III], or an acid salt thereof, with the phenylpyruvic acid derivative [IV]. The reaction is preferably carried out in the presence of an inert solvent such as lower alkanols, e.g., methanol, ethanol and the like. The reaction temperature is not particularly limited, but is ordinarily within the range of from room temperature to the boiling point of the solvent employed. Examples of the acid salt of nitrophenylhydrazine include an inorganic acid salt such as hydrochloride, hydrobromide or sulfate, or an organic acid salt such as acetate or oxalate. The nitrophenylhydrazine [III] or a salt thereof is used in an equimolar amount or more of the phenylpyruvic acid derivative.

Examples of the phenylhydrazone derivatives [VII] obtained by process of the present invention, include the following compounds:

methyl phenylpyruvate p-nitrophenylhydrazone
ethyl phenylpyruvate p-nitrophenylhydrazone
tertiary butyl phenylpyruvate p-nitrophenylhydrazone
phenylpyruvic acid p-nitrophenylhydrazone
phenylpyruvic acid m-nitrophenylhydrazone
phenylpyruvic acid o-nitrophenylhydrazone
(o-chlorophenyl)pyruvic acid p-nitrophenylhydrazone
(o-fluorophenyl)pyruvic acid p-nitrophenylhydrazone
(o-bromophenyl)pyruvic acid p-nitrophenylhydrazone
(p-chlorophenyl)pyruvic acid p-nitrophenylhydrazone
(m-chlorophenyl)pyruvic acid p-nitrophenylhydrazone
ethyl (o-chlorophenyl)pyruvate p-nitrophenylhydrazone The phenylhydrazone derivative [VIIa] may be obtained by reacting the ester of α-benzyl-β-keto-acid derivative [VI] with the nitrobenzenediazonium compound [V] in a suitable solvent, e.g., water, methanol, ethanol or the like, in the presence of a base, e.g., caustic soda, caustic potash, potassium carbonate, sodium methylate, sodium ethylate sodium acetate, potassium acetate or the like. The reaction proceeds smoothly.

Because of unstability of the diazonium compound, the reaction can be preferably carried out below 10°C., more preferably below 5°C.

Examples of the phenylhydrazone derivative [VIIa] obtained by the process of the present invention include the following compounds:

methyl phenylpyruvate p-nitrophenylhydrazone
ethyl phenylpyruvate p-nitrophenylhydrazone
tertiary butyl phenylpyruvate p-nitrophenylhydrazone
ethyl phenylpyruvate m-nitrophenylhydrazone
ethyl (o-chlorophenyl)pyruvate p-nitrophenylhydrazone
ethyl (o-bromophenyl)pyruvate p-nitrophenylhydrazone
ethyl (o-fluorophenyl)pyruvate p-nitrophenylhydrazone
ethyl (p-chlorophenyl)pyruvate p-nitrophenylhydrazone
ethyl (m-chlorophenyl)pyruvate p-nitrophenylhydrazone Although two isomers (Syn and anti forms) of the phenylhydrazone derivative [VII] are observed both isomers can be used for the next reaction step.

[B] Preparation of indole-2-carboxylic acid derivative [VIII]:

The indole-2-carboxylic acid derivative [VIII] is obtained by treating the phenylhydrazone derivative [VII] with an acid, in a suitable solvent.

As the solvent, there is used, for example, a lower alkanol such as methanol, ethanol, isopropanol or tertiary butanol; an aromatic hydrocarbon such as benzene, toluene or xylene; an organic acid such as formic or acetic acid; or other organic solvent such as chloroform or cyclohexane. An organic acid such as formic or acetic acid, or an alcohol is particularly preferable for the reaction.

As the acid, there is used, for example, a mineral acids such as hydrochloric acid, hydrobromic acid, sulfuric acid, phosphoric acid and polyphosphoric acid, organic acid such as formic acid and acetic acid or other acidic reagents, including Lewis acids such as zinc chloride, iron chloride, aluminum chloride and boron fluoride. The reaction is generally effected at elevated temperature.

In the present invention, examples of the indole-2-carboxylic acid derivative [VIII] include the following compounds:

5-nitro-3-phenyl-indole-2-carboxylic acid
ethyl 5-nitro-3-phenyl-indole-2-carboxylate
methyl 5-nitro-3-phenyl-indole-2-carboxylate
tertiary butyl 5-nitro-3-phenyl-indole-2-carboxylate
ethyl 6 (or 4) nitro-3-phenyl-indole-2-carboxylate
7-nitro-3-phenyl-indole-2-carboxylic acid
3-(o-chlorophenyl)-5-nitro-indole-2-carboxylic acid
3-(o-bromophenyl)-5-nitro-indole-2-carboxylic acid
3-(o-fluorophenyl)-5-nitro-indole-2-carboxylic acid
3-(m-chlorophenyl)-5-nitro-indole-2-carboxylic acid
3-(p-chlorophenyl)-5-nitro-indole-2-carboxylic acid The indole-2-carboxylic acid derivative [VIII] can also be directly obtained, by reacting the nitrophenylhydrazine [III], or a salt thereof, with the phenylpyruvic acid derivative [IV].

The reaction can be carried out in a solvent, for example, an alkanol such as methanol, ethanol, isopropanol and tertiary butanol, aromatic hydrocarbon such as benzene, toluene, xylene, and the like, organic acid such as formic acid and acetic acid, and the like, or an other inert organic solvent such as acetone, chloroform, cyclohexane, and the like, preferably in the presence of an acid catalyst, for example, mineral acid such as hydrogen chloride, hydrogen bromide, sulfuric acid, phosphoric acid, polyphosphoric acid, and the like, organic acid such as formic acid and acetic acid, Lewis acid such as zinc chloride, iron chloride, aluminum chloride, boron fluoride, and the like, or cation exchange resin.

As the salt of phenylhydrazine derivative [III], there may be used, for example, an inorganic salt such as hydrochloride, hydrobromide or sulfate; or an organic acid salt such as acetate or oxalate.

The reaction is effected under conditions similar to that of the above-mentioned preparation from the phenylhydrazone derivative to 2-carboxylic acid derivative [VIII]. However, when the reaction is carried out under mild conditions, the phenylhydrazone derivative [VII] is obtained. In this case, isolation of the compound [VII] is not necessarily required for this cyclization reaction.

In the present invention, examples of the indole-2-carboxylic acid derivative [VIII] include the following compounds:

5-nitro-3-phenyl-indole-2-carboxylic acid
methyl 5-nitro-3-phenyl-indole-2-carboxylate
ethyl 5-nitro-3-phenyl-indole-2-carboxylate
tertiary butyl 5-nitro-3-phenyl-indole-2-carboxylate
6 (or 4)-nitro-3-phenyl-indole-2-carboxylic acid
7-nitro-3-phenyl-indole-2-carboxylic acid
3-(o-chlorophenyl)-5-nitro-indole-2-carboxylic acid
3-(o-fluorophenyl)-5-nitro-indole-2-carboxylic acid
3-(o-bromophenyl)-5-nitro-indole-2-carboxylic acid
3-(m-chlorophenyl)-5-nitro-indole-2-carboxylic acid
3-(p-chlorophenyl)-5-nitro-indole-2-carboxylic acid It is also possible to directly obtain the indole-2-carboxylic acid derivative [VIIIa] represented by the formula,

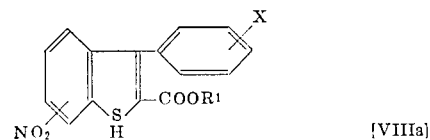

[VIIIa]

wherein $R^1$ and X have the same significances as mentioned before, by reacting the nitrobenzenediazonium compound [V] with the ester of α-benzyl-β-keto-acid derivative [VI].

According to the above process, the ester of α-benzyl-β-keto-acid derivative represented by the formula [VI] is allowed to react with the said diazomium compound represented by the formula [V] in a suitable solvent, e.g., water, methanol or ethanol, in the presence of a base, e.g., caustic soda, caustic potash, potassium carbonate, sodium methylate sodium ethylate, sodium acetate, potassium acetate or the like, whereby the reaction proceeds smoothly.

Because of unstability of the benzene diazonium salt, it is preferable to carry out the reaction below 10°C., more preferably below 5°C. Thereafter, treatment of the reaction product with an acid causes formation of the ester of indole-2-carboxylic acid derivative represented by the aforesaid formula [VIIIa]. However, an intermediate produced during this reaction is preferably once isolated and treated with an acid in an organic solvent to yield very readily the aimed ester of indole-2-carboxylic acid derivative [VIIa] in good yield. In this reaction, an acid, for example, mineral acid such as hydrogen chloride, hydrogen bromide, sulfuric acid, phosphoric acid, polyphosphoric acid, and the like, or other Lewis acid such as zinc chloride, ferrous chloride, aluminum chloride, stannous chloride, boron fluoride and the like is suitable.

In this reaction, following solvents are most useful, for example, alkanols such as methanol, ethanol and isopropanol, aromatic hydrocarbons such as benzene, toluene and xylene, organic acids such as formic acid and acetic acid, or common organic solvents such as acetone, chloroform and cyclohexane.

In the present invention, examples of the indole-2-carboxylic acid derivative [VIIIa] include the following compounds:

methyl 5-nitro-3-phenyl-indole-2-carboxylate
ethyl 5-nitro-3-phenyl-indole-2-carboxylate
tertiary butyl 5-nitro-3-phenyl-indole-2-carboxylate
ethyl 6 (or 4)-nitro-3-phenyl-indole-2-carboxylate
ethyl 7-nitro-3-phenyl-indole-2-carboxylate
ethyl 3-(o-chlorophenyl)-5-nitro-3-indole-2-carboxylate ethyl 3(o-bromophenyl)-5-nitro-3-indole-2-carboxylate
ethyl 3-(o-fluorophenyl-5-nitro-indole-2-carboxylate
ethyl 3-(m-chlorophenyl)-5-nitro-indole-2-carboxylate
ethyl 3-(p-chlorophenyl)-5-nitro-indole-2-carboxylate The indole-2-carboxylic acid derivative of the formula [VIIIa] is converted to an indole-2-carboxylic acid derivative represented by the formula,

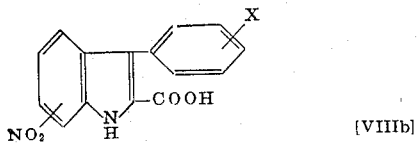

[VIIIb]

wherein X has the same significance as mentioned before.

The above process is effected by treating the aforesaid indole-2-carboxylic acid derivative of the formula [VIIIa] in a solvent in the presence of a hydrolyzing agent.

As the solvent, there is used water or a lower alkanol such as methanol, ethanol or isopropyl alcohol. An organic solvent, for example, lower alkanol, acetone, tetrahydrofuran, ethylene glycol or the like can be used in the presence of water for the reaction.

As a hydrolyzing agent, there is used an alkali metal such as sodium, potassium or lithium; an alkali metal hydroxide such as sodium hydroxide or potassium hydroxide; an alkali metal carbonate such as sodium carbonate or potassium carbonate; an alkaline earth metal hydroxide such as barium hydroxide or calcium hydroxide; or an ammonia compound such as ammonium hydroxide. However, the use of an alkali metal or alkaline earth metal hydroxide is particularly preferable. The reaction proceeds at room temperature but is desirably effected at an elevated temperature.

Further, the indole-2-carboxylic acid derivative [VIIIa] may also be hydrolyzed in an organic acid, such as acetic or propionic acid, in the presence of a mineral acid.

When $R^1$ is a tertiary butyl group, the indole-2-carboxylic acid derivative [VIIIa] can also be converted to the desired carboxylic acid [VIIIb] by heating it with a mineral acid or toluenesulfonic acid. The desired substance can be obtained also as a metal salt or an ammonium salt.

In the present invention, examples of the indole-2-carboxylic acid derivative [VIIIb] include the following compounds:

5-nitro-3-phenyl-indole-2-carboxylic acid
6 (or 4)-nitro-3-phenyl-indole-2-carboxylic acid
7-nitro-3-phenyl-indole-2-carboxylic acid
5-nitro-3-(o-chlorophenyl)-indole-2-carboxylic acid
  5-nitro-3-(o-fluorophenyl)-indole-2-carboxylic acid 5-nitro-3-(m-chlorophenyl)-indole-2-carboxylic acid
5-nitro-3-(p-chlorophenyl)-indole-2-carboxylic acid It is needless to say that the indole-2-carboxylic acid derivative [VIIIb] can also be directly obtained either from a phenylhydrazone derivative, in which $R^3$ of [VII] is a hydrogen atom, i.e. a phenylhydrazone represented by the formula,

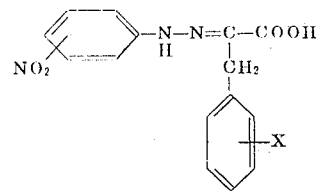

[VIIb]

or by reacting the nitrophenylhydrazine derivative of the formula [III] with a compound represented by the formula,

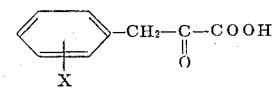

[IVb]

[C] Preparation of indole-2-carboxamide derivative [X]

In the present invention, the indole-2-carboxamide derivative [X] is a novel compound, and is obtained by reacting the aforesaid indole-2-carboxylic acid derivative [VIIIb] with a halogenating agent in the presence or absence of an inert solvent to the indole-2-carboxylic halide derivative [IX] and then reacting the said halide derivative with ammonia.

In this halogenation reaction, there is used an inert solvent, such as benzene, toluene, chloroform, methylene chloride or carbon tetrachloride.

Halogenating agents include thionyl chloride, phosphorus trichloride, phosphorus tribromide, phosphorus pentachloride, phosphorus oxychloride, phosgene and the like. The reaction rate may be accelerated by adding a basic reagent such as pyridine or dimethylformamide. Further, the starting indole-2-carboxylic acid derivative [VIIIb] may be used either in the form of a free carboxylic acid or in the form of a metal salt such as sodium salt.

After removing the solvent and excess of reacting agents, the reaction product is obtained, if necessary, by treatment such as extraction with an inert solvent to give the objective product. In this case, isolation or further purification of this product is not always easy. However, in leading the indole -2-carboxylic halide, for example, to indole-2-carboxylic acid amide, isolation or purification is not always necessary and crude products or a reaction mixture can be used as it is for carrying out the reaction. In the above manner, a chloride, bromide or the like is obtained.

In the present invention, examples of the indole-2-carboxylic halide derivative [IX] include the following compounds:

5-nitro-3-phenyl-indole-2-carboxylic chloride
6 (or 4)-nitro-3-phenyl-indole-2-carboxylic chloride
7-nitro-3-phenyl-indole-2-carboxylic chloride
5-nitro-3-phenyl-indole-2-carboxylic bromide
3-(o-bromophenyl)-5-nitro-indole-2-carboxylic chloride
3-(o-fluorophenyl)-5-nitro-indole-2-carboxylic chloride 3-(p-chlorophenyl)-5-nitro-indole-2-carboxylic chloride 3-(m-chlorophenyl)-5-nitro-indole-2-carboxylic chloride The amidation of an indole-2-carboxylic halide derivative [IX] is preferably effected in the presence of a solvent. As the solvent, there can be used a lower alkanol such as methanol or ethanol; or an organic solvent such as ether, acetone, benzene, toluene, xylene, chlorobenzene, chloroform or the like.

In the present reaction, ammonia can be used by introducing gaseous ammonia to a reaction mixture or adding alcoholic ammonia (such as methanolic ammonia, ethanolic ammonia) or aqueous ammonia to a reaction mixture.

Since the reaction proceeds at room temperature, heating or cooling is not always required. If desired, however, the reaction may be controlled by heating or cooling.

The indole-2-carboxamide derivatives [X] have central nervous depressant activities.

In the present invention, examples the indole-2-carboxamide derivative [X] include the following compounds:

5-nitro-3-phenyl-indole-2-carboxamide
6 (or 4)-nitro-3-phenyl-indole-2-carboxamide
7-nitro-3-phenyl-indole-2-carboxamide
3-(o-chlorophenyl)-5-nitro-indole-2-carboxamide
3-(o-bromophenyl)-5-nitro-indole-2-carboxamide
3-(o-fluorophenyl)-5-nitro-indole-2-carboxamide
3-(p-chlorophenyl)-5-nitro-indole-2-carboxamide 3-(m-chlorophenyl)-5-nitro-indole-2-carboxamide

[D] Preparation of indole-2-carbonitrile derivative [XI]

In the present invention, the novel indole-2-carbonitrile derivative [XI] may be prepared by dehydrating the indole-2-carboxamide derivative [X]. The dehydration of the indole-2-carboxamide [X] is effected by heating the same, preferably in the presence of a dehydrating agent. As the dehydrating agent, there can be used, for example, a phosphorus halide such as phosphorus oxychloride, phosphorus trichloride or phosphorus pentachloride; or an acid chloride such as p-toluenesulfonyl chloride, methyl sulfonyl chloride, acetyl chloride, thionyl chloride, benzoyl chloride or carbobenzyloxy chloride. The reaction is carried out in the presence or absence of a solvent. The dehydrating agent itself may be used as the solvent. After completion of the reaction, the desired product is isolated from the solvent and the dehydrating agent.

In the present invention, examples of indole-2-carbonitrile derivative [XI] include the following compounds:

5-nitro-3-phenyl-indole-2-carbonitrile
6 (or 4)-nitro-3-phenyl-indole-2-carbonitrile
7-nitro-3-phenyl-indole-2-carbonitrile
3-(o-chlorophenyl)-5-nitro-indole-2-carbonitrile
3-(o-bromophenyl)-5-nitro-indole-2-carbonitrile
3-(o-fluorophenyl)-5-nitro-indole-2-carbonitrile
3-(p-chlorophenyl)-6-nitro-indole-2-carbonitrile
3-(m-chlorophenyl)-5-nitro-indole-2-carbonitrile

[E] Preparation of 2-aminomethylindole derivative [II]

In the present invention, the novel 2-aminomethylindole derivative [II] or its salt is prepared by reducing the indole-2-carbonitrile derivative [XI]. The reduction is effected by reacting the indole-2-carbonitrile derivative [XI] with a suitable reducing agent in a solvent.

The reducing agent, which may selectively reduce the cyano group to an aminomethyl group, without effecting the nitro group and/or halogen atom, can be used.

Examples of the reducing agent usable in the present invention include boron hydrides such as diborane, aluminum borohydride, calcium borohydride and sodium trimethoxy borohydride, and sodium borohydrides incorporated with metal halides such as aluminum halides. Particularly, the diborane is preferably used. When diborane is used as reducing agent gaseous diborane is introduced into the reaction mixture, or diborane is accured in the reaction system. For example, the reduction is effected by using diborane generated from sodium borohydride and boron trifuloride or mercurous chloride in the reaction system. In the reduction by diborane, solvent such as ether, tetrahydrofuran, dioxane dyglyme or the like can be preferably used. Generally, the reaction is effected at a temperature within the range from room temperature to the boiling point of the solvent employed. After completion of the reaction, excess of reducing agent is decomposed for example by addition of water or an acid such as hydrochloric acid. The 2-amino-methylindole derivative [II] may be obtained as the corresponding salt by treatment on an inorganic acid such as hydrochloric, hydrobromic, sulfuric, nitric or phosphoric acid, or an organic acid such as acetic or formic acid. The 2-aminomethylindole derivatives [II] and salts thereof show hypoglycemic activity.

In the present invention, examples of the 2-aminomethyl indole derivative [II] include the following compounds:

2-aminomethyl-5-nitro-3-phenyl-indole
2-aminomethyl-6 (or 4)-nitro-3-phenyl-indole
2-aminomethyl-7-nitro-3-phenyl-indole
2-aminomethyl-3-(o-chlorophenyl)-5-nitro-indole
2-aminomethyl3-(o-bromophenyl)-5-nitro-indole
2-aminomethyl3-(o-fluorophenyl)-5-nitro-indole
2-aminomethyl-3-(m-chlorophenyl)-5-nitro-indole
2-aminomethyl-3-(p-chlorophenyl)-5-nitro-indole and these hydrochlorides, hydrobromides, sulfate, phosphate and acetates.

[F] Production of benzodiazepine derivative [I]

According to the present final process, a benzodiazepine derivative [I] is produced from the 2-aminomethylindole derivative [II] or a salt thereof.

In carrying out the process for preparing the benzodiazepine derivatives according to the present invention, 2-aminomethylindole derivatives represented by the formula [II] or their salts are reacted with an appropriate oxidizing agent, for example, ozone, hydrogen peroxide, peracid (e.g., performic acid, peracetic acid and perbenzoic acid), chromic acid and potassium permanganate. The oxidizing agent used in the process of the invention is not limited, however, only to those exemplified above. The reaction is generally readily effected at room temperature. Higher or lower temperature is sometimes found more satisfactory.

Chromium trioxide is preferred as oxidizing agent. The reaction may preferably be carried out in the presence of a solvent. The solvent depends upon the oxidizing agents used, and is selected from water, acetone, carbon tetra-chloride, acetic acid, sulfuric acid and any of the other solvents which do not react substantially with any of the reactants. The oxidizing agent is used in a stoichiometric amount or more. The reaction temperature used depends upon the oxidizing agent used.

In the case which the oxidation is carried out using chromium trioxide in the presence of acetic acid, it is preferable to use 2-3 3 times a stoichiometric amount of chromium trioxide and to conduct the reaction at room temperature. A 2-aminomethylindole derivative or its salt such as hydrochloride, hydrobromide, sulfate, nitrate, acetate and the like is dissolved or suspended in a solvent and an oxidizing agent is added thereto with stirring. The reaction is generally completed within about 24 hours.

In the present invention, the benzodiazepine derivative [I] may be taken up as an acid addition salt by treatment with an inorganic acid such as hydrochloric, sulfuric, or nitric acid; or an organic acid such as maleic, fumaric, succinic, formic or acetic acid.

Examples of the benzodiazepine derivative obtained according to the present process include the following compounds.
  5-phenyl-7-nitro-1,3-dihydro-2H-1,4-benzodiazepine-2-one
  5-phenyl-8-nitro-1,3-dihydro-2H-1,4-benzodiazepine-2-one
  5-phenyl-9-nitro-1,3-dihydro-2H-1,4-benzodiazepine-2-one
  5-(o-chlorophenyl)-7-nitro-1,3-dihydro-2H-1,4-benzodiazepine-2-one
  5-(o-bromophenyl)-7-nitro-1,3-dihydro-2H-1,4-benzodiazepine-2-one
  5-(o-fluorophenyl)-7-nitro-1,3-dihydro-2H-1,4-benzodiazepine-2-one
  5-(m-chlorophenyl)-7-nitro-1,3-dihydro-2H-1,4-benzodiazepine-2-one
  5-(p-chlorophenyl)-7-nitro-1,3-dihydro-2H-1,4-benzodiazepine-2-one.

EXAMPLE 1

To a solution of 22.5 g. of phenylpyruvic acid in 500 ml. of ethanol is added 21 g. of p-nitrophenylhydrazine and the mixture is heated under reflux for 30 min. After the reaction is complete, the solvent is removed under reduced pressure to give phenylpyruvic acid p-nitrophenylhydrazone quantitatively.

The following compounds are similarly prepared:
  methyl phenylpyruvate p-nitrophenylhydrazone
  ethyl phenylpyruvate p-nitrophenylhydrazone
  tertiary butyl phenylpyruvate p-nitrophenylhydrazone
  phenylpyruvic acid m-nitrophenylhydrazone
  phenylpyruvic acid o-nitrophenylhydrazone
  (o-chlorophenyl)pyruvic acid p-nitrophenylhydrazone
  (o-fluorophenyl)pyruvic acid p-nitrophenylhydrazone
  (o-bromophenyl)pyruvic acid p-nitrophenylhydrazone
  (p-chlorophenyl)pyruvic acid p-nitrophenylhydrazone
  (m-chlorophenyl)pyruvic acid p-nitrophenylhydrazone

EXAMPLE 2

To a solution of 22.5 g. of phenylpyruvic acid in 500 ml. of ethanol is added 21 g. of p-nitrophenylhydrazine and the mixture was heated under reflux for 30 min. The resultant mixture is concentrated and then cooled. The precipitate is collected by filtration to give 12 g. of the α isomer of phenylpyruvic acid p-nitrophenylhydrazone, one of two isomers. Recrystallization from ethanol gives pale yellow fine needles, m.p. 191° – 192°C. (decomp.)

IR cm$^{-1}$: $\nu_{N-H}$3260 (in Nujol); $\nu_{C-O}$1669 (in Nujol)
UV $\lambda_{max}^{EtOH}$: 382 m$\mu$ ($\epsilon$ 31,100)

The filtrate is further concentrated to give 28 g. of another isomer, the β form of phenylpyruvic acid p-nitro-phenylhydrazone, m.p. 177° – 179°C. Recrystallization from benzene gives yellow fine needles, m.p. 185°– 186°C. (decomp.)

IR $\nu_{max}^{paraffin}$ cm$^{-1}$: 3310 (NH); 1714 (CO)
UV: $\lambda_{max}^{EtOH}$: 372 m$\mu$ ($\epsilon$ 28,800)

EXAMPLE 3

To an ice cold solution of 150 g. of ethyl α-benzylacetoacetate in 700 ml. of ethanol is added portionwise 236 ml. of 50 percent aqueous potassium hydroxide solution under cooling, and then 1390 ml. of ice-water is added to the mixture. To this mixture is added dropwise, a cold diazonium salt solution prepared from 96 g. of p-nitroaniline, 278 ml. of conc. hydrochloric acid, 278 ml. of water and a solution of 48 g. of sodium nitrite in 140 ml. of water. After addition, the reaction mixture is stirred for 10 min. under cooling, and extracted with ether. The ethereal layer is dried over sodium sulfate and the ether is evaporated to give 216 g. (96.6 percent) of ethyl phenylpyruvate p-nitrophenylhydrazone as an oil, which is partially solidified on standing overnight. The solid is recrystallized from ethanol to give the α isomer having m.p. 110° – 114°C.

IR $\nu_{max}^{paraffin}$ cm$^{-1}$: 3330 (NH); 1729 (CO)
Anal. Calcd. for $C_{17}H_{17}O_4N_3$: C, 62.38; H, 5.24; N, 12.83%.
Found: C, 62,35; H, 5.14; N, 12,72%.

To a solution of 111.1 g. of the said crude oily ethyl phenylpyruvate p-nitrophenylhydrazone in 400 ml. of ethanol is introduced dry gaseous hydrogen chloride for 40 min., while the temperature is arised to 64°C.

The mixture is cooled and filtered to give 49.8 g. of the β isomer of the ethyl phenylpyruvate p-nitrophenylhydrazone, m.p. 121° – 124°C. Recrystallization from ethanol gives the product of m.p. 125.5° – 129.5°C.

IR $\nu_{max}^{paraffin}$ cm$^{-1}$: 3220 (NH); 1694 (CO)
Anal. Calcd. for $C_{17}H_{17}O_4N_3$: C, 62.38; H, 5.24; N, 12.83%.
Found: C, 62.44; H, 4.93; N, 12.64%.

The following compounds are similarly prepared;
  methyl phenylpyruvate p-nitrophenylhydrazone
  ethyl phenylpyruvate p-nitrophenylhydrazone
  tertiary butyl phenylpyruvate p-nitrophenylhydrazone ethyl phenylpyruvate m-nitrophenylhydrazone
ethyl (o-chlorophenyl)pyruvate p-nitrophenylhydrazone
ethyl (o-bromophenyl)pyruvate p-nitrophenylhydrazone
ethyl (o-fluorophenyl)pyruvate p-nitrophenylhydrazone
ethyl (p-chlorophenyl)pyruvate p-nitrophenylhydrazone
ethyl (m-chlorophenyl)pyruvate p-nitrophenylhydrazone

EXAMPLE 4

A suspension of 40 g. of phenylpyruvic acid p-nitrophenylhydrazone in 1.5 l of 50 percent furmic acid is heated under reflux for 4 hours. The solvent is removed under reduced pressure, and the residue is washed with ethanol to give 37 g. of 5-nitro-3-phenyl-indole-2-carboxylic acid. Recrystallization from ethanol gives orange yellow crystals, m.p. 299°C. (decomp.).

EXAMPLE 5

A suspension of 1 g. of the β isomer of ethyl phenylpyruvate p-nitrophenylhydrazone in 40 ml. of 50 percent furmic acid is heated under reflux for 4 hours. The solvent is removed under reduced pressure and the residue is washed a small amount of ethanol to give 0.75 g. of ethyl 5-nitro-3-phenyl-indole-2-carboxylate, m.p. 235°–237°C. (decomp.).

EXAMPLE 6

A mixture of 32.7 g. of ethyl phenylpyruvate p-nitrophenylhydrazone, 200 ml. of acetic acid and 200 ml. of conc. hydrochloric acid is heated under reflux for 2 hours. After cooling, the solid is collected by filteration, washed with water to give 23.8 g. of ethyl 5-nitro-3-phenylindole-2-carboxylate.

The following compounds are similarly prepared:
methyl 5-nitro-3-phenyl-indole-2-carboxylate
tertiary butyl 5-nitro-3-phenyl-indole-2-carboxylate
ethyl 6 (or 4)-nitro-3-phenyl-indole-2-carboxylate
7-nitro-3-phenyl-indole-2-carboxylic acid
3-(o-chlorophenyl)-5-nitro-indole-2-carboxylic acid
3-(p-bromophenyl)-5-nitro-indole-2-carboxylic acid
3-(o-fluorophenyl)-5-nitro-indole-2-carboxylic acid
3-(m-chlorophenyl)-5-nitro-indole-2-carboxylic acid
3-(p-chlorophenyl)-5-nitro-indole-2-carboxylic acid

EXAMPLE 7

A mixture of 7.1 g. of p-nitroaniline, 20.9 g. of conc. hydrochloric acid and 20 ml. of water is heated into a solution, and then cooled to 0°C. To the mixture is added dropwise a solution of 3.7 g. of sodium nitrite in 7 ml. of water below 0°C., and the mixture is stirred for 10 min. To the mixture is added 11.7 g. of sodium acetate and the mixture is stirred for 30 min. below 5°C. The resultant mixture is added dropwise to an ice-cold solution of 11 g. of ethyl α-benzylacetoacetate and 14.7 g. of anhydrous potassium acetate in methanol below 3°C., and stirring is continued for additional 2 hours below 10°C. The reaction mixture is extracted with 200 ml. of ither. The ethereal layer is washed with water, dried over sodium sulfate and evaporated to an oil.

To the oily residue is added 50 ml. of isopropyl-alcohol and 50 ml. of conc. hydrochloric acid and the mixture is heated under reflux for 5 hours. After cooling the precipitate is collected by filteration, washed with water and dried to give 8.8 g. of ethyl 5-nitro-3-phenyl-indole-2-carboxylate.

Example 8

A mixture of 7.1 g. of p-nitroaniline, 20.9 g. of conc. hydrochloric acid and 20 ml. of water is heated into a solution, and then cooled to 0°C. The mixture is diazotized by adding dropwise a solution of 3.7 g. of sodium nitrate in 7 ml. of water below 0°C. To the mixture is added 11.7 g. of sodium acetate and the mixture is stirred for 30 min. below 5°C. The resultant mixture is added dropwise to an ice-cold solution of 11 g. of ethyl α-benzylacetoacetate and 14.7 g. of anhydrous potassium acetate in methanol below 3°C. with stirring. The reaction mixture is stirred for 1 hour below 10°C., and heated under reflux 4 hours. After cooling, the solid is separated and taken up with methanol and water to give ethyl phenylpyruvate p-nitrophenylhydrazone (14.5 g.), m.p. 108°–117°C.

This hydrazone is heated with 45 ml. of isopropyl-alcohol and 45 ml. of conc. sulfuric acid. After reflux for 5 hours, the reaction mixture is cooled. The solid is collected by filtration, washed with water and dried to give 10.5 g. of ethyl 5-nitro-3-phenyl-indole-2-carboxylate, m.p. 218°C.

The following compounds are similarly prepared:
methyl 5-nitro-3-phenyl-indole-2-carboxylate
tertiary butyl 5-nitro-3-phenyl-indole-2-carboxylate
ethyl 6 (or 4)-nitro-3-phenyl-indole-2-carboxylate
ethyl 7-nitro-3-phenyl-indole-2-carboxylate
ethyl 3-(o-chlorophenyl)-5-nitro-indole-2-carboxylate
ethyl 3-(o-bromophenyl)-5-nitro-indole-2-carboxylate
ethyl 3-(o-fluorophenyl)-5-nitro-indole-2-carboxylate
ethyl 3-(m-chlorophenyl)-5-nitro-indole-2-carboxylate
ethyl 3-(p-chlorophenyl)-5-nitro-indole-2-carboxylate

EXAMPLE 9

To a solution of 22.5 of phenylpyruvic acid in 500 ml. of ethanol is added 21 g. of p-nitrophenylhydrazine. The mixture is refluxed for 30 min. and the solvent is evaporated. To the residue is added 1.5 l of 50 percent formic acid and the mixture is heated under reflux for 4 hours. The solvent is removed under reduced pressure and the residue is washed with ethanol to yield 5-nitro-3-phenyl-indole-2-carboxylic acid, m.p. 297°C. (decomp.), quantitatively. Recrystallization from ethanol gives orange yellow crystals, m.p. 299°C. (decomp.).

Anal. Calcd. for $C_{15}H_{10}O_4N_2$: C, 63.83; H, 3.57; N, 9.92%.
Found: C, 63.40; H, 3.51; N, 10.02%.

EXAMPLE 10

A mixture of 25 g. of phenylpyruvic acid, 23 g. of p-nitrophenylhydrazine, 480 ml. of acetic acid and 450 ml. of conc. hydrochloric acid is heated for 2 hours. The reaction mixture is cooled and then poured into ice-water. The precipitate is collected by filtration, washed with water and dried to give 40 g. of 5-nitro-3-phenyl-indole-2-carboxylic acid. A sample is recrystallized from ethanol to give crystals, m.p. 299°C. (decomp.).

EXAMPLE 11

To a solution of 112.6 g. of p-nitrophenylhydrazine and 119.2 g. of phenylpyruvic acid in 2 l of acetic acid is added 2 l of conc. hydrochloric acid with stirring. The mixture is heated (to 93°C.) under reflux for 1 hour and then cooled. The precipitate is collected by filtration, washed with water and dried to yield 168.2 g. of 5-nitro-3-phenyl-indole-2-carboxylic acid, m.p. 287°C. (decomp.).

The following compounds are similarly prepared:
methyl 5-nitro-3-phenyl-indole-2-carboxylate
tertiary butyl 5-nitro-3-phenyl-indole-2-carboxylate
6 (or 4)-nitro-3-phenyl-indole-2-carboxylic acid
7-nitro-3-phenyl-indole-2-carboxylic acid
3-(o-chlorophenyl)-5-nitro-indole-2-carboxylic acid
3-(o-fluorophenyl)-5-nitro-indole-2-carboxylic acid
3-(o-bromophenyl)-5-nitro-indole-2-carboxylic acid
3-(m-chlorophenyl)-5-nitro-indole-2-carboxylic acid
3-(p-chlorophenyl)-5-nitro-indole-2-carboxylic acid

EXAMPLE 12

To a solution of 2.7 g. of potassium hydroxide in 50 ml. of isopropyl alcohol and 1 ml. of water is added 6.2 g. of ethyl 5-nitro-3-phenyl-indole-2-carboxylate and the mixture is heated under reflux for 4.5 hours.

The mixture is concentrated and the residue is dissolved in water. The cooled solution is made acidic with conc. hydrochloric acid under cooling. The precipitate formed is collected by filtration, washed thoroughly with water and dried to give 5.5 g. of 5-nitro-3-phenyl-indole-2-carboxylic acid, m.p. 287°C. (decomp.).

The following compounds are similarly prepared:
6 (or 4)-nitro-3-phenyl-indole-2-carboxylic acid
7-nitro-3-phenyl-indole-2-carboxylic acid
5-nitro-3-(o-chlorophenyl)-indole-2-carboxylic acid
5-nitro-3-(o-fluorophenyl)-indole-2-carboxylic acid
5-nitro-3-(m-chlorophenyl)-indole-2-carboxylic acid
5-nitro-3-(p-chlorophenyl)-indole-2-carboxylic acid

EXAMPLE 13

A mixture of 163.1 g. of 5-nitro-3-phenyl-indole-2-carboxylic acid and 420 ml. of thionyl chloride is heated under reflux for 1 hour. The excess of thionyl chloride is removed under reduced pressure to give 5-nitro-3-phenyl-indole-2-carboxylic chloride quantitatively.

This product is confirmed by the following process. To the suspension of this crude 5-nitro-3-phenyl-indole-2-carboxylic chloride in 2 l of dry toluene is introduced gaseous ammonia. The precipitate is collected by filtration, washed with water and dried to give 5-nitro-3-phenyl-indole-2-carboxamide quantitatively, m.p. 291°– 293°C.

The following compounds are similarly prepared:
6-(or 4)-nitro-3-phenyl-indole-2-carboxylic chloride
7-nitro-3-phenyl-indole-2-carboxylic chloride
5-nitro-3-phenyl-indole-2-carboxylic bromide
3-(o-chlorophenyl)-5-nitro-indole-2-carboxylic chloride
3-(o-bromophenyl)-5-nitro-indole-2-carboxylic chloride
3-(o-fluorophenyl)-5-nitro-indole-2-carboxylic chloride
3-(p-chlorophenyl)-5-nitro-indole-2-carboxylic chloride
3-(m-chlorophenyl)-5-nitro-indole-2-carboxylic chloride

EXAMPLE 14

A mixture of 27.5 g. of 5-nitro-3-phenyl-indole-2-carboxylic acid and 115 g. of thionyl chloride is heated under reflux for 30 min. The excess of thionyl chloride is removed under reduced pressure and the residue is dissolved in 400 ml. of anhydrous tetrahydrofuran. Gaseous ammonia is introduced into the solution under ice-cooling. The precipitate is collected by filtration, washed with water and then ethanol, and dried to give 14.5 g. of 5-nitro-3-phenyl-indole-2-carboxamide, m.p. 299° –302°C. The tetrahydrofuran layer is concentrated to dryness under reduced pressure and the residue is washed with water, ethanol and ether successively, and dried to give an additional 12.1 g. of 5-nitro-3-phenyl-indole-2-carboxamide, m.p. 295.5° – 297°C. Recrystallization from methanol affords the analytical sample, m.p. 302°C.

Anal. Cald. for $C_{15}H_{11}O_3N_3$: C, 64.05; H, 3.94; N, 14.94%.

Found: C, 64.13; H, 3.89; N, 14.15%.

EXAMPLE 15

A mixture of 168.0 g. of 5-nitro-3-phenyl-indole-2-carboxylic acid and 710 g. of thionyl chloride is heated under reflux for 1.5 hours. The excess thionyl chloride is removed under reduced pressure and the residue is suspended in 2 l of dry toluene. Gaseous ammonia is introduced into the suspension for 2 hours. The precipitate is collected by filtration, washed with water and ether, and dried to give 160.4 g. of 5-nitro-3-phenyl-indole-2-carboxamide.

The following compounds are similarly prepared:
6 (or 4)-nitro-3-phenyl-indole-2-carboxamide
7-nitro-3-phenyl-indole-2-carboxamide
3-(o-chlorophenyl)-5-nitro-indole-2-carboxamide
3-(o-bromophenyl)-5-nitro-indole-2-carboxamide
3-(o-fluorophenyl)-5-nitro-indole-2-carboxamide
3-(p-chlorophenyl)-5-nitro-indole-2-carboxamide
3-(m-chlorophenyl)-5-nitro-indole-2-carboxamide

EXAMPLE 16

A mixture of 13.5 g. of 5-nitro-3-phenyl-indole-2-carboxamide and 59 g. of phosphorous oxychloride is heated under reflux for 30 min. The reaction mixture is poured over crushed ice with stirring. The precipitate is collected by filtration, washed with water and dried to give 11 g. of 5-nitro-3-phenyl-indole-2-carbonitrile, m.p. 261°C. Recrystallization from methanol gives pale yellow needles, m.p. 263°– 264°C.

Analysis Calculated for $C_{15}H_9O_2N_3$: C, 68.44; H, 3.45; N, 15.94%. Found: C, 68.61; H, 3.07; N, 16.19%.

The following compounds are similarly prepared:
6 (or 4)-nitro-3-phenyl-indole-2-carbonitrile
7-nitro-3-phenyl-indole-2-carbonitrile 3-(o-chlorophenyl)-5-nitro-indole-2-carbonitrile
3-(o-bromophenyl)-5-nitro-indole-2-carbonitrile
3-(o-fluorophenyl)-5-nitro-indole-2-carbonitrile
3-(p-chlorophenyl)-5-nitro-indole-2-carbonitrile
3-(m-chlorophenyl)-5-nitro-indole-2-carbonitrile

EXAMPLE 17

To a solution of 20 g. of 5-nitro-3-phenyl-indole-2-carbonitrile in 800 ml. of dry tetrahydrofuran is added 5.8 g. of powdered sodium borohydride and the mixture is stirred at room temperature for 30 min.. To the mixture is added dropwise a solution of 30 g. of boron trifluoride etherate in 400 ml. of dry tetrahydrofuran with stirring. The resultant mixture is stirred at room temperature and then heated under reflux for 2 hours. The reaction mixture is cooled, acidified with 400 ml. of 15 percent hydrochloric acid to decompose the excess hydride, and then the mixture is neutralized with 200 ml. of ammonium hydroxide. The organic layer is separated and the aqueous phase is extracted with ether. The extracts are combined with the organic layer, washed with saline water, dried over sodium sulfate and evaporated to give 47 g. of crude 2-aminomethyl-5dnitro-3-phenyl-indole.

The crude product (20.1 g.) is dissolved in acetic acid (20 ml.) and ether is added to the solution. The precipitate is collected by filtration to give 2-aminomethyl-5-nitro-3-phenyl-indole acetate, (6.2 g.), m.p. 174° – 175°C. Recrystallization from ethanol gives an analytical sample, m.p. 182° – 184°C.

Analysis Calculated for $C_{15}H_{13}O_2 \cdot N_3 \cdot C_2H_4O_2$: C, 62.37; H, 5.24; N, 12.84%. Found: C, 62.61; H, 5.13; N, 12.78%.

The following compounds are similarly prepared:
2-aminomethyl-6 (or 4)-nitro-3-phenyl-indole
2-aminomethyl-7-nitro-3-phenyl-indole
2-aminomethyl-3-(o-chlorophenyl)-5-nitro-indole
2-aminomethyl-3-(o-bromophenyl)-5-nitro-indole
2-aminomethyl-3-(o-fluorophenyl)-5-nitro-indole
2-aminomethyl-3-(m-chlorophenyl)-5-nitro-indole
2-aminomethyl-3-(p-chlorophenyl)-5-nitro-indole
and these hydrochlorides, hydrobromides, sulfate, phosphate and acetates.

EXAMPLE 18

A mixture of 1 g. of 2-aminomethyl-5-nitro-3-phenyl-indole acetate, 10 ml. of acetic acid and a solution of 1 g. of chromic anhydride in 1 ml. of water, is stirred at room temperature overnight. To the reaction mixture is added 20 ml. of water and the mixture is neutralized with ammonium hydroxide. The precipitate is separated and dissolved in methylene chloride containing ethanolic hydrogen chloride. The mixture is concentrated and the residue is dissolved in 10 ml. of pyridine, and heated under reflux for 20 min. The solvent is removed under reduced pressure to the residue, which is taken up water, collected by filtration and washed with ethanol to give 7-nitro-5-phenyl-1,3-dihydro-2H-1,4-benzodiazepin-2-one, m.p. 220° – 222°C. Recrystallization raised the m.p. to 224° – 225°C.

The following compounds are similarly prepared:
8-nitro-5-phenyl-1,3-dihydro-2H-1,4-benzodiazepin-2-one
9-nitro-5-phenyl-1,3-dihydro-2H-1,4-benzodiazepin-2-one
5-(o-chlorophenyl)-7-nitro-1,3-dihydro-2H-1,4-benzodiazepin-2-one
5-(o-bromophenyl)-7-nitro-1,3-dihydro-2H-1,4-benzodiazepin-2-one
5-(o-fluorophenyl)-7-nitro-1,3-dihydro-2H-1,4-benzodiazepin-2-one
5-(m-chlorophenyl)-7-nitro-1,3-dihydro-2H-1,4-benzodiazepin-2-one
5-(p-chlorophenyl)-7-nitro-1,3-dihydro-2H-1,4-benzodiazepin-2-one.

We claim:
1. A 2-aminomethylindole derivative represented by the formula,

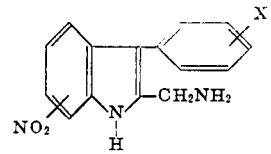

[II]

wherein X represents a hydrogen or halogen atom, or its acid addition salt.

* * * * *